United States Patent
Murthy et al.

(10) Patent No.: US 7,103,611 B2
(45) Date of Patent: Sep. 5, 2006

(54) TECHNIQUES FOR RETAINING HIERARCHICAL INFORMATION IN MAPPING BETWEEN XML DOCUMENTS AND RELATIONAL DATA

(75) Inventors: Ravi Murthy, Fremont, CA (US); Muralidhar Krishnaprasad, Fremont, CA (US); Anand Manikutty, Foster City, CA (US); Zhen Liu, San Mateo, CA (US); James Warner, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 10/428,443

(22) Filed: May 1, 2003

(65) Prior Publication Data

US 2004/0220927 A1 Nov. 4, 2004

(51) Int. Cl.
*G06F 17/30* (2006.01)

(52) U.S. Cl. .................................................. 707/102
(58) Field of Classification Search ............... 707/1–10, 707/100–104.1, 200–205; 709/217
See application file for complete search history.

(56) References Cited

U.S. PATENT DOCUMENTS

| | | | |
|---|---|---|---|
| 5,404,513 | A | 4/1995 | Powers et al. |
| 5,878,415 | A | 3/1999 | Olds |
| 5,974,407 | A | 10/1999 | Sacks |
| 5,987,506 | A | 11/1999 | Carter et al. |
| 6,038,563 | A | 3/2000 | Bapat et al. |
| 6,055,544 | A | 4/2000 | DeRose et al. |
| 6,061,684 | A | 5/2000 | Glasser et al. |
| 6,128,610 | A | 10/2000 | Srinivasan et al. |
| 6,141,655 | A | 10/2000 | Johnson et al. |
| 6,154,741 | A | 11/2000 | Feldman |
| 6,199,195 | B1 | 3/2001 | Goodwin et al. |
| 6,208,993 | B1 | 3/2001 | Shadmon |
| 6,263,332 | B1 | 7/2001 | Nasr et al. |
| 6,298,349 | B1 | 10/2001 | Toyoshima et al. |
| 6,343,287 | B1 | 1/2002 | Kumar et al. |

(Continued)

OTHER PUBLICATIONS

Peng, Feng et al., Xpath on left queries on streaming data, 2003, ACM Press, pp. 421–442.*
Jean–Yes Vio Dury, Xpath on the left and right sides of rules: toward compact XML tree rewriting through node patterns, 2003, ACM Press, pp. 19–25.*
Josephine Cheng, et al., "IBM DB2 XML Extender, An end–to–end solution for storing and retrieving XML documents," IEEE, ICDE '00 Conference, San Diego, Feb. 2000, 128 pages.

(Continued)

*Primary Examiner*—Diane Mizrahi
(74) *Attorney, Agent, or Firm*—Hickman Palermo Truong & Becker LLP

(57) ABSTRACT

Techniques for managing XML data in an SQL compliant DBMS include receiving an SQL statement. The SQL statement includes a particular operator that operates on a first instance of XML type that represents a first set of XML elements. During execution of the SQL statement, the particular operator is evaluated by generating an ordered collection of instances of XML type. Each different instance in the ordered collection is based on a different XML element from the first set; and there is an instance in the ordered collection for every XML element from either the first set or from the first set and its descendents. When descendents are included, each entry in the ordered collection indicates a level in the XML tree. In another aspect, an aggregate operator in the SQL statement operates on a collection of instances, with associated levels, to generate a single instance of XML type.

24 Claims, 8 Drawing Sheets

U.S. PATENT DOCUMENTS

| | | | |
|---|---|---|---|
| 6,356,920 B1 | | 3/2002 | Vandersluis |
| 6,366,934 B1 | | 4/2002 | Cheng et al. |
| 6,470,344 B1 | | 10/2002 | Kothuri et al. |
| 6,487,546 B1 | | 11/2002 | Witkowski |
| 6,496,842 B1 | | 12/2002 | Lyness |
| 6,708,186 B1 | * | 3/2004 | Claborn et al. ............. 707/102 |
| 6,772,350 B1 | | 8/2004 | Belani et al. |
| 6,785,673 B1 | | 8/2004 | Fernandez et al. |
| 6,836,778 B1 | * | 12/2004 | Manikutty et al. .......... 707/102 |
| 2001/0037345 A1 | | 11/2001 | Kieman et al. |
| 2003/0009361 A1 | | 1/2003 | Hancock et al. |
| 2003/0065659 A1 | | 4/2003 | Agarwal et al. |
| 2003/0093672 A1 | | 5/2003 | Cichowlas |
| 2003/0140308 A1 | | 7/2003 | Murthy et al. |
| 2003/0182624 A1 | | 9/2003 | Large |
| 2004/0064466 A1 | * | 4/2004 | Manikutty et al. .......... 707/100 |
| 2004/0088415 A1 | | 5/2004 | Chandrasekar et al. |
| 2004/0220912 A1 | * | 11/2004 | Manikutty et al. ............. 707/3 |
| 2004/0220927 A1 | | 11/2004 | Murthy et al. |
| 2004/0230667 A1 | * | 11/2004 | Wookey ..................... 709/217 |
| 2005/0010896 A1 | | 1/2005 | Meliksetian et al. |

OTHER PUBLICATIONS

Jim Melton, "ISO–ANSI Working Draft, XML–Related Specifications (SQL/XML)," WG3: DRS–020, H2–2002–365, Aug. 2002, 154 pages.

Oracle Corporation, "Oracle9i XML Database Developer's Guide—Oracle XML DB," Release 2 (9.2), Mar. 2002, Part No. A96620–1, pp. 10–1–10–54.

W3C, "XML Schema Part 1: Structures," W3C Recommendation, May 2, 2001, http://www.w3.org/TR/2001/REC–xmlschema–1–20010502/, pp. 1–203 (text provided on CD–ROM).

W3C, "XML Schema Part 2: Datatypes," W3C Recommendation, May 2, 2001, http://www.w3.org/TR/2001/REC–xmlschema–2–20010502/, pp. 1–146 (text provided on CD–ROM).

Dayen, I., "Storing XML in Relational Databases", XML.com XP–002275971(1998–2004) pp. 1–13.

Funderbunk, J. et al., "XML programming with SQL/XML and XQuery", *IBM Systems Journal* XP–002295973 (2002) pp. 642–665.

Hierarchical Queries, XP–002295972, pp. 8–3 to 8–7.

PCT/US2004/010018—International Search Report and Written Opinion (14 pages).

PCT/US2004/010018—current claims.

Peng, Feng et al., "XPath queries on streaming data", 2003, ACM Press, pp. 431–442.

Vion–Dury, Jean–Yves, "XPath on left and right sides of rules: toward compact XML tree rewriting through node patterns", 2003, ACM Press, pp. 19–25.

Notification of Transmittal of the International Preliminary Report on Patentability as received in corresponding PCT international application No. PCT/US2004/010018.

R. Bourret et al.: A generic Load/Extract Utility for Data Transfer Between XML Documents and Relational Databases, 8–9 Jun. 2000, IEEE Computing SOC., pages 134–143.

* cited by examiner

110 XML DOCUMENT INSTANCE: ORG (ORGANIZATION)

112a ELEMENT: EMPLOYEE

114a ELEMENT: ENAME (EMPLOYEE NUMBER)

114b ELEMENT: EINFO (EMPLOYEE INFORMATION)

116a ELEMENT: EMPLOYEE

116b ELEMENT: EMPLOYEE

••• 115

130 XML DATABASE SERVER

140 DATABASE STORAGE SPACE

144 EMP TABLE WITH COLUMNS: ENO; ENAME; EINFO, MGR, ...

148 XML TYPE VIEW

FIG. 2B

202 LINE NUMBERS

```
1  ...
2  <ORG>
3    <EMPLOYEE ENO = "1">
4      <ENAME> Linda </ENAME> <EINFO> ... </EINFO>
5      <EMPLOYEE ENO = "2">
6        <ENAME> Charles </ENAME> <EINFO> ... </EINFO>
7        <EMPLOYEE ENO = "4">
8          <ENAME> Alice </ENAME> <EINFO> ... </EINFO>
9          <EMPLOYEE ENO = "6">
10           <ENAME> Ray </ENAME> <EINFO> ... </EINFO>
11           <EMPLOYEE ENO = "7">
12             <ENAME> Vishnu </ENAME> <EINFO> ... </EINFO>
13           </EMPLOYEE>
14           <EMPLOYEE ENO = "8">
15             <ENAME> Cetin </ENAME> <EINFO> ... </EINFO>
16           </EMPLOYEE>
17         </EMPLOYEE>
18       </EMPLOYEE>
19       <EMPLOYEE ENO = "5">
20         <ENAME> Mary </ENAME> <EINFO> ... </EINFO>
21       </EMPLOYEE>
22     </EMPLOYEE>
23     <EMPLOYEE ENO = "3">
24       <ENAME> Terry </ENAME> <EINFO> ... </EINFO>
25       <EMPLOYEE ENO = "9">
26         <ENAME> Steve </ENAME> <EINFO> ... </EINFO>
27       </EMPLOYEE>
28     </EMPLOYEE>
29   </EMPLOYEE>
30 </ORG>
```

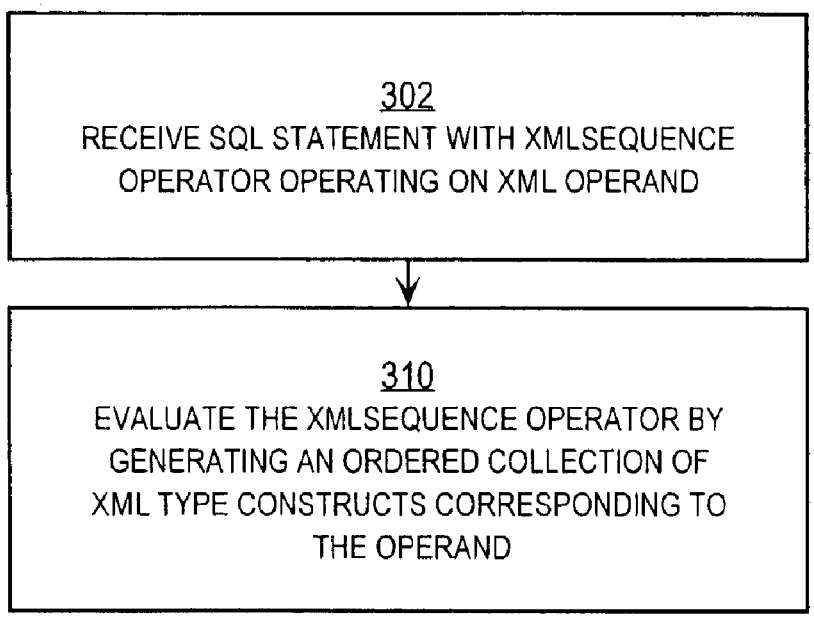
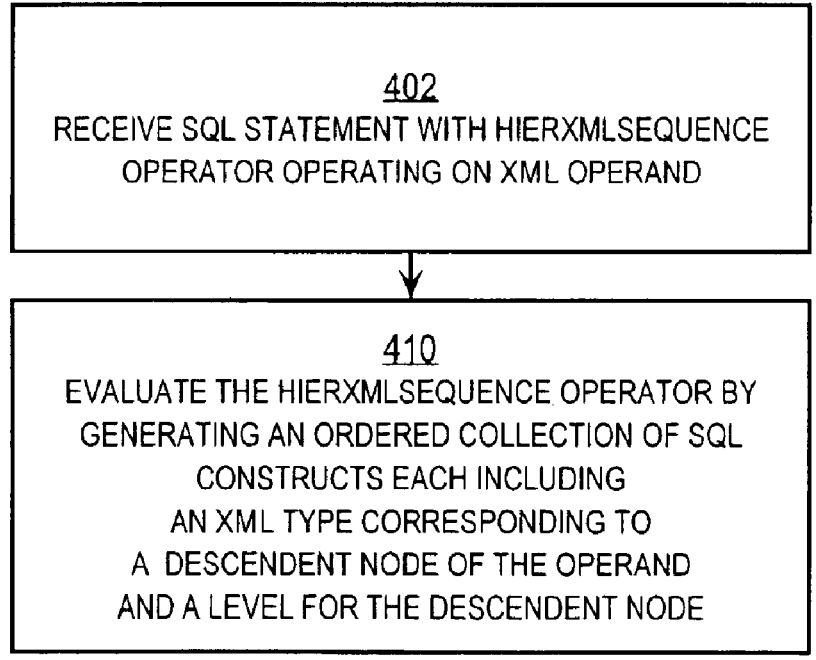

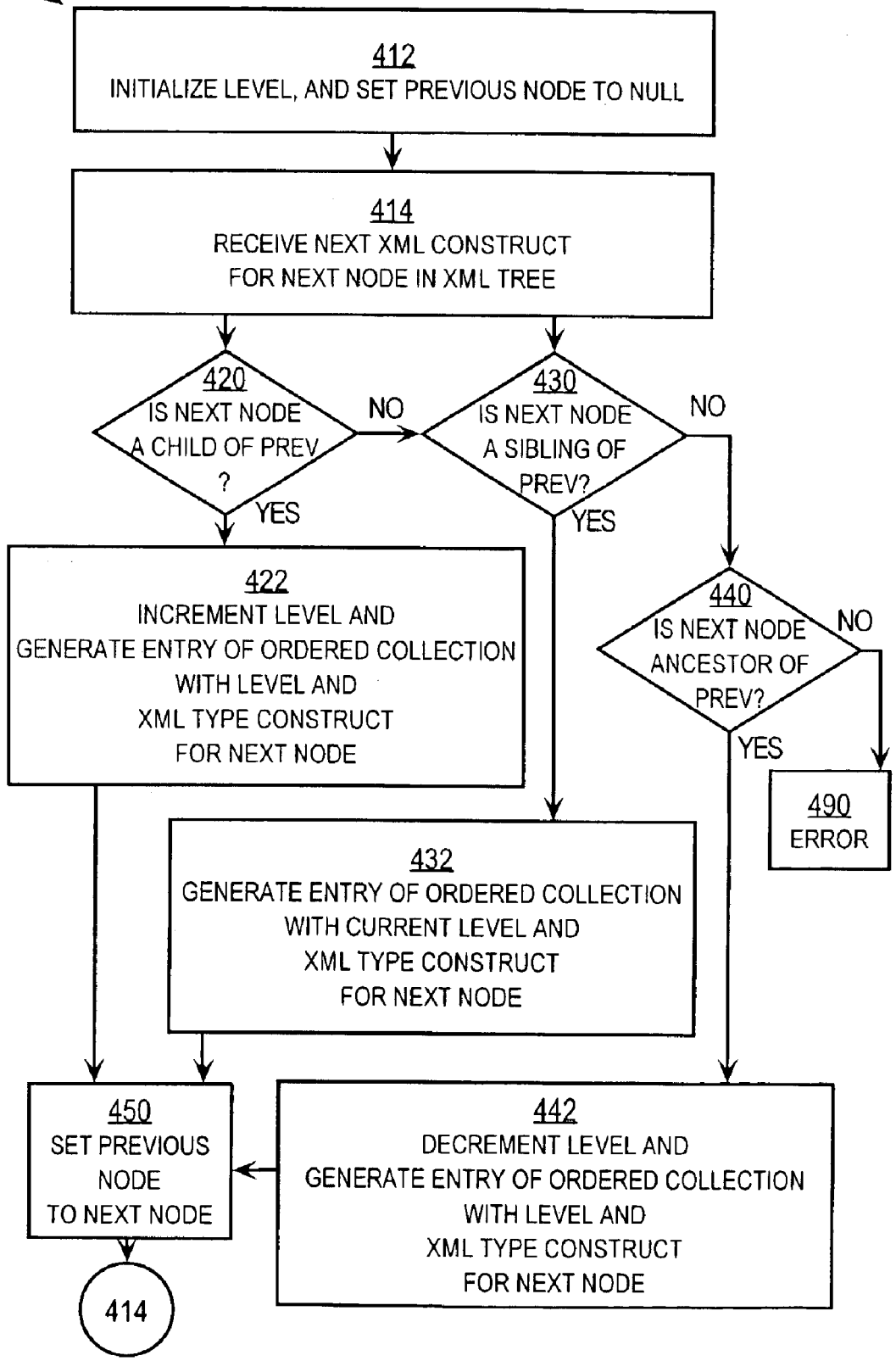

500

502
RECEIVE SQL STATEMENT WITH HIERXMLAGGREGATE OPERATOR OPERATING ON AN XML TYPE OPERAND AND A LEVEL OPERAND

510
EVALUATE THE HIERXMLAGGREGATE OPERATOR BY INSERTING AN XML CONSTRUCT CORRESPONDING TO THE XML TYPE OPERAND INTO AN ANCESTOR XML CONSTRUCT AT A DEPTH INDICATED BY THE LEVEL OPERAND

TECHNIQUES FOR RETAINING HIERARCHICAL INFORMATION IN MAPPING BETWEEN XML DOCUMENTS AND RELATIONAL DATA

CROSS REFERENCE TO RELATED APPLICATION

This application is related to application Ser. No. 10/428,878, filed May 1, 2003, (hereinafter referenced as Manikutty et al.).

FIELD OF THE INVENTION

The present invention relates to techniques for using eXtensible Markup Language (XML) data in a relational database system.

BACKGROUND OF THE INVENTION

The World Wide Web (WWW) involves a network of servers on the Internet, each of which is associated with one or more Hypertext Markup Language (HTML) pages. The HTML pages are transferred between clients that make requests of servers and the servers using the Hypertext Transfer Protocol (HTTP). Resources available from servers on the Internet are located using a Universal Resource Locator (URL). The standards and protocols of the WWW are promulgated by the World Wide Web Consortium (W3C) through its servers at www.w3c.org, and are used on many private networks in addition to their use on the Internet.

The HTML standard is one application of a more general markup language standard called the Standard Generalized Markup Language (SGML). Recently, a subset of SGML that is more powerful and flexible than HTML has been defined and has gained popularity for transferring information over the Internet and other networks. The new standard, developed and promoted by W3C, is called the eXtensible Markup Language (XML). XML provides a common syntax for expressing structure in data. Structured data refers to data that is tagged for its content, meaning, or use. XML provides an expansion of the tagging that is done in HTML, which focuses on format or presentation. XML tags identify XML elements and attributes of XML elements. XML elements can be nested to form hierarchies of elements.

Given the elements defined and used by XML, a document object model (DOM) is a tree structure formed to define how the information in an XML document is arranged. The DOM is navigated using an XPath expression that indicates a particular node or content in the hierarchy of elements and attributes in an XML document. XPath is a standard promulgated by W3C.

Relational databases predate, and developed independently of, the World Wide Web. Relational databases store data in various types of data containers that correspond to logical relationships within the data. As a consequence, relational databases support powerful search and update capabilities. Relational databases typically store data in tables of rows and columns where the values in all the columns of one row are related. For example, the values in one row of an employee table describe attributes of the same employee, such as her name, social security number, address, salary, telephone number and other information. Each attribute is stored in a different column. Some attributes, called collections, can have multiple entries. For example, the employee may be allowed to have multiple telephone numbers. Special structures are defined in some relational databases to store collections.

A relational database management system (DBMS) is a system that stores and retrieves data in a relational database. The relational DBMS processes requests to perform database functions such as creating and deleting tables, adding and deleting data in tables, and retrieving data from the tables in the database. A well-known standard language for expressing the database requests is the Structured Query Language (SQL).

Because of the popularity of XML as a data exchange format that supports hierarchical relationships among elements, and because of the power of relational DBMSs to update and retrieve data, there is a demand for generating XML data output from relational databases and storing XML data into relational databases. In one approach, a database administrator can commission programming efforts to generate code in a procedural language that maps data in particular XML constructs to data in particular relational database constructs and back. Such programming efforts can be expensive.

In another approach, declarative statements, similar to SQL statements, can be employed to simply express the relationship between XML constructs and SQL constructs. General routines that convert the data according to declared relationships are written one time by a DBMS vendor and supplied to a database administrator. This saves the database administrator from developing procedural language programs to convert the data. To support this demand, an industry standard SQL to operate on XML documents has been developed. This standard is called SQL/XML and information relating to SQL/XML is available at the time of this writing at www.sqlx.org. SQL/XML provides declarative statements that can be used to simply express some conversions between data in hierarchical XML constructs and data in SQL relational constructs (. For example XMLAgg is a SQL/XML function that generates one XML document from a set of XML elements generated from selected rows of a relational table.

As used herein, XML constructs include XML documents, XML elements, document fragments that include multiple XML elements, and XML attributes of XML elements, among others. Data manipulated in an SQL compliant DBMS, and structured by the DBMS so as to support generation of XML constructs to convey that data, are called "instances of XML type," or simply "XML data." Such XML data may or may not be stored in such SQL constructs as tables, rows and columns.

While SQL/XML statements provide powerful tools for many circumstances that arise in converting between XML constructs and SQL constructs, they do not simply accommodate all circumstances that arise. For example, an instance of XML type may include data for an employee element that includes several child elements corresponding to various devices signed out to the employee. A user of the DBMS may want to generate a series of XML documents that describes the devices that satisfy some criterion. A conventional SQL/XML statement for extracting those child elements produces a single instance with all the devices that satisfy the criterion. To generate a separate instance of XML type for each separate device, several conventional statements are used, one for each device that satisfies a subcriterion. It is tedious to generate several statements. In some circumstances it may be impossible to predict the criterion to separate each device from the others. It is preferable in these circumstances to be able to use a single statement to produce the series of separate instances of XML type.

The current SQL/XML statements also do not support retaining some hierarchical relationships when converting between XML constructs and SQL constructs. Some XML elements may be nested within their own type to form a hierarchy. For example, a XML element called "employee" may have one or more other employee elements as child elements, which represent other employees supervised by the first employee. In some circumstances, the SQL/XML function EXTRACT operating on several employee elements in the document will simply output all those several employee element in series, without the nesting indicated in the original XML document. The result is a list of employees without the hierarchical information that indicates whether some employees as supervised children employees of a manager parent employee.

Some SQL rows may imply a hierarchy within a table of rows. For example, an "emp" table may include one row for each employee and include a column "mgr" which holds a pointer to another row of the emp table for a second employee who is a supervisor of the first employee. The SQL/XML function XMLAgg operating on multiple XML elements generated from the rows of this table will simply produce an XML document fragment with a set of root level elements (for example a series of XML elements of element name "employee"). The hierarchy is implied by the mgr attribute of each employee element; but, it would be more desirable if the employee elements were nested so that supervised employees are child elements of the manager employee element.

Based on the foregoing, there is a clear need for declarative statements that enhance the manipulation of XML data in an SQL compliant DBMS. In particular, there is a need for declarative statements that preserve hierarchical relationships implied in SQL constructs when data in those constructs are converted to instances of XML type. There is also a particular need for declarative statements that preserve hierarchical relationships in an instance of XML type when that instance is converted to multiple instances of XML type.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an XML document, an XML schema, and object-relational constructs that store XML document contents in an object-relational database, according to an embodiment;

FIG. 2B is a block diagram that illustrates XML constructs in a portion 201 of an example XML document corresponding to the tree hierarchy of FIG. 2A;

FIG. 3 is a flow diagram that illustrates an overview of a method for generating a collection of XML type SQL constructs, according to an embodiment;

FIG. 4A is a flow diagram that illustrates an overview of a method for generating a collection of XML type SQL constructs with additional hierarchical information, according to an embodiment;

FIG. 4B is a flow diagram that illustrates an embodiment of a step of the method of FIG. 4A;

DETAILED DESCRIPTION OF THE INVENTION

Figure 2A:
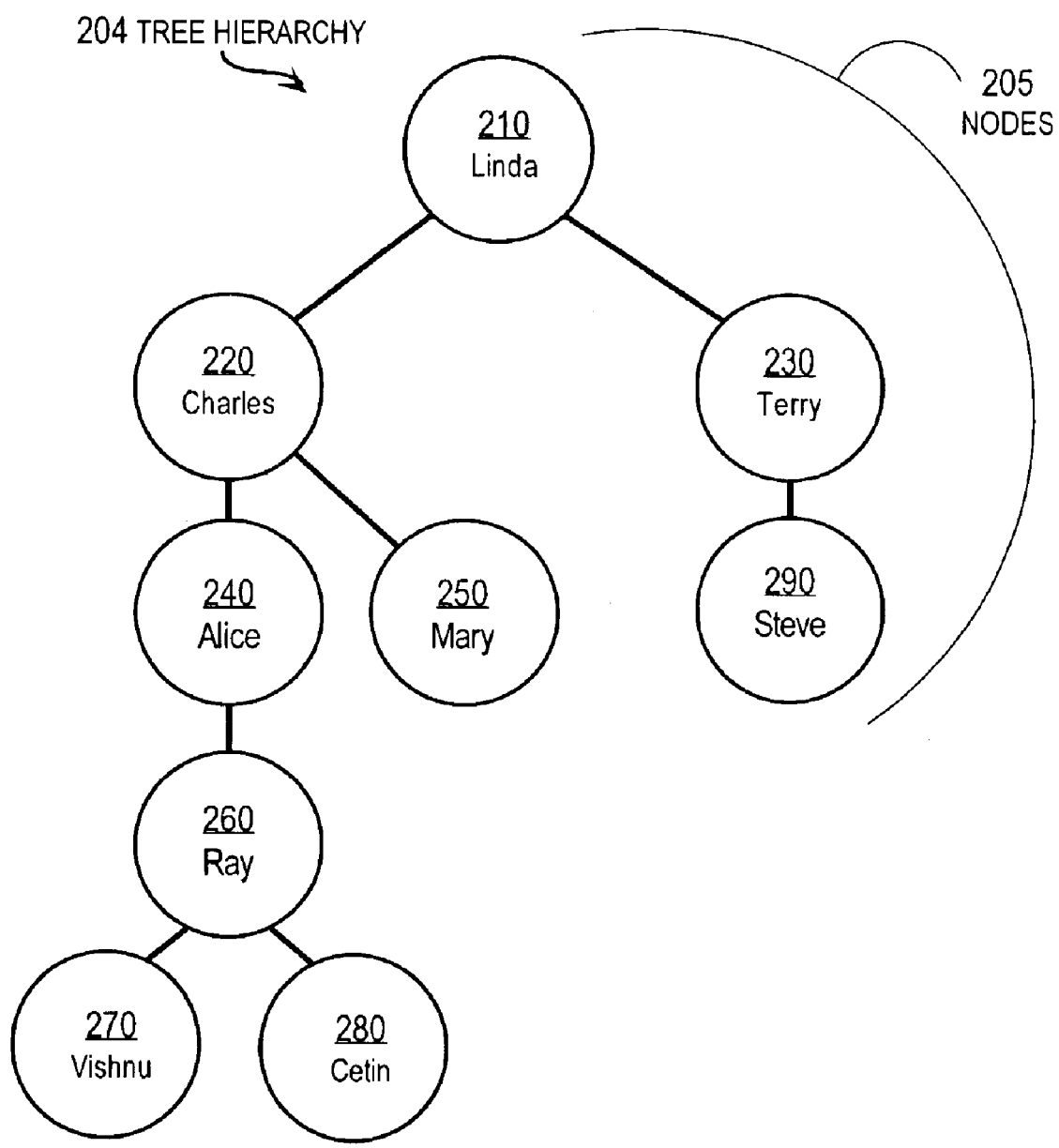
FIG. 2A is a block diagram that illustrates an example tree hierarchy.

Techniques are described for manipulating XML data in a SQL compliant DBMS. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

New XML operations are provided for manipulating XML data in a SQL compliant DBMS. The DBMS allows instances of XML type to represent XML constructs such as XML documents, XML elements, XML document fragments that include several XML elements, and XML attributes of XML elements. According to one aspect of the invention, techniques include receiving an SQL statement at the DBMS. The SQL statement includes a sequence operator that operates on a first instance of XML type that represents a first set of zero or more XML elements. During execution of the SQL statement, the sequence operator is evaluated by generating an ordered collection of zero or more instances of XML type. Each different instance of XML type in the ordered collection is based on a different XML element from the first set, and there is an instance of XML type in the ordered collection for every XML element in the first set. These techniques allow declarative statements that enhance the manipulation of SQL instances of XML type.

According to another aspect of the invention, an SQL statement is received that includes a hierarchical sequence operator. The hierarchical sequence operator operates on a first instance of XML type that represents at least a first XML construct that includes a first set of one or more XML constructs for which the first XML construct is an ancestor node in an XML tree hierarchy. During execution of the SQL statement, the hierarchical sequence operator is evaluated by generating an ordered collection of one or more entries. Each entry in the ordered collection includes a particular instance of XML type and data that indicates a level. The particular instance of XML type represents a particular XML construct of the first set. The data indicates a level of the particular XML construct in the XML tree. The techniques of this aspect allow declarative statements that preserve hierarchical relationships in XML constructs when those constructs are manipulated as multiple instances of XML type.

According to another aspect of the invention, an SQL statement is received that includes a hierarchical aggregation operator. The hierarchical aggregation operator operates on a particular instance of XML type and data that indicates a particular level. The particular instance of XML type is one of multiple instances of XML type to be included in a result instance that represents an ancestor XML construct. The ancestor XML construct has an associated XML tree hierarchy. The particular level indicates a level in the XML tree hierarchy where a particular XML construct represented by the particular instance of XML type is to be placed. During execution of the SQL statement, the hierarchical aggregation operator is evaluated by inserting the particular instance of XML type into the result instance of XML type at a depth indicated by the level. These techniques allow declarative statements that preserve hierarchical relationships implied in SQL constructs when data from those constructs are converted to instances of XML type or output as XML constructs.

Embodiments are described in the following in the context of a commercial extensible markup language/structured query language (XML/SQL) database server, which uses object-relational constructs for storage of content for one or more XML documents, and which responds to XPath queries for that content to be manipulated or output as one or more XML documents or document fragments made up of one or more XML constructs. XPath queries involve an XPath expression to locate data in an XML document and zero or more SQL/XML functions to produce, combine or compare data located by an XPath expression. SQL/XML standard functions include EXTRACT, EXTRACTVALUE, AND EXISTSNODE, which are well known in the art. However, the invention is not limited to this context, but may be applied in any context involving relational database constructs and XML data.

Structural Overview

Structures involved in embodiments of the invention include XML documents with XML constructs and relational database constructs (also called SQL constructs). FIG. 1 is a block diagram that illustrates an example XML document 110, and example object-relational constructs that store XML document contents in an object-relational database managed by an object-relational database server 130.

XML document 110 is an instance of a particular XML document type, called hereinafter an "ORG" XML document, which describes organizational relationships among employees in an enterprise. For purposes of illustration it is assumed that an example ORG document 110 includes an XML element 112a of type EMPLOYEE (named "EMPLOYEE") for the manager of an organization. Each EMPLOYEE type element includes an attribute (not shown) for an employee number (named "ENO"), and two XML elements of types ENAME, EINFO and zero or more other elements of type EMPLOYEE. XML element of type ENAME such as XML element 114a holds contents that indicate an employee name. XML element of type EINFO such as XML element 114b holds contents that indicate other employee information such as address and salary. Included XML elements of type EMPLOYEE such as XML elements 116a, 116b hold contents that indicate employees supervised by the employee identified by the contents of the attribute and ENAME and EINFO elements. EMPLOYEE type elements, such as XML elements 116a, 116b and others indicated by ellipsis 115, are collectively referenced hereinafter as child EMPLOYEE elements 116.

Example XML database server 130 is an XML object-relational database server, which imports and exports XML documents, which represents one or more XML constructs as an instance of XML type (also called herein an XML instance), and which stores contents for the XML constructs in one or more SQL constructs in database storage space 140. The database storage space 140 includes one or more other SQL constructs, such as table 144 and view 148.

In the illustrated embodiment, the tables are not directly related to the XML ORG documents. For example, there is no table in which each row corresponds to a different ORG document or to a different EMPLOYEE element. One way such a circumstance may arise is that the data may have been stored in EMP table 144 and used in multiple applications before ORG type XML documents were defined. Another circumstance is that EMP is purposefully designed to be more compact than a table of instances of XML type. The EMP table is not an XML type table; and the EMP table includes a column with column name mgr to store data that represents an employee's manager, which is not an XML type column.

XML queries have no meaning for object relational constructs such as table 144 and column MGR that are not XML type. An XML type object must be generated for such XML queries. An XML type object may be generated in an XML object-relational database server from SQL constructs that are not instances of XML type by using one or more XML generation functions in SQL/XML. For example, the XML generation function XMLElement generates an instance of XML type from one or more objects or scalar columns that are not XML type. An XML type object (an instance of XML type) can be used by the DBMS to generate a data stream of XML constructs. The XML generation function XMLAttributes generates an attribute for an XML type object from a scalar column. XML type objects may also be combined using one or more SQL/XML functions. A sub-query including XML generation functions must be included in XML queries directed to data in object-relational constructs that are not XML type. In some cases a sub-query including XML generation functions may be stored as an XML type view, such as XML type view 148.

Example New XML Functions

According to some embodiments, three example XML functions that enhance the management of XML data in an SQL compliant DBMS are called XMLSequence, HierXMLSequence, and HierXMLAggregate, described in more detail in following sections.

Example Contents of XML Constructs and SQL Constructs

To illustrate the use of these functions in declarative SQL statements to manipulate XML data, it is assumed that the data listed in Table 1 resides in EMP table 144.

TABLE 1

Example contents of EMP table 144.

| ENO | ENAME | EINFO | MGR |
|---|---|---|---|
| 1 | Linda | . . . | null |
| 2 | Charles | . . . | 1 |
| 3 | Terry | . . . | 1 |
| 4 | Alice | . . . | 2 |
| 5 | Mary | . . . | 2 |
| 6 | Ray | . . . | 4 |
| 7 | Vishnu | . . . | 6 |
| 8 | Cetin | . . . | 6 |
| 9 | Steve | . . . | 3 |

The EMP table is a flat file of interchangeable rows using SQL constructs; however, a hierarchy of employees is implied. For example, the contents listed in Table 1 indicate that Linda (ENO=1) is at the top of the hierarchy; and Charles (ENO=2) and Terry (ENO=3) report to her. Alice (ENO=4) and Mary (ENO=5) report to Charles. Ray (ENO=6) reports to Alice. Both Vishnu (ENO=7) and Cetin (ENO=8) report to Ray. Steve (ENO=9) reports to Terry. This implied hierarchy is shown as a tree of nodes in FIG. 2A.

FIG. 2A is a block diagram that illustrates a tree hierarchy. In FIG. 2A, the nodes 205 include nodes 210, 220, 230, 240, 250, 260, 270, 280, 290. A root node 210 represents the employee Linda. Two employees, Charles and Terry, represented by child nodes 220, 230, respectively, report to Linda represented by node 210. The node 230 representing Terry has one child node 290 that represents the employee Steve who reports to Terry. The node 220 representing Charles has two child nodes 240, 250 that represent the employees Alice, Mary, respectively, who report to Charles. The node 240 representing Alice has one child node 260 that represents the employee Ray who reports to Alice. The node 260 representing Ray has two child nodes 270, 280 that represent the employees Vishnu, Cetin, respectively, who report to Ray.

An XML ORG document that expresses the same information using XML constructs is shown in FIG. 2B. FIG. 2B is a block diagram that illustrates XML constructs in a portion 201 of an example XML document. In FIG. 2B, a portion 201 of an ORG type XML document is shown using XML constructs. Each line in portion 201 is indicated by a line number 202 listed to the left of the line in FIG. 2B. The ellipsis in line 1 indicates XML constructs that precede the root element ORG in the document, such as data that indicates a version of XML and a namespaces to be used for valid elements and attributes. The XML constructs representing Linda, at node 210, includes those constructs in line numbers 4 through 29. The XML constructs representing the descendent elements of Linda are indicated by brackets labeled 220 through 290 for the corresponding nodes in FIG. 2A. Although XML constructs are separated onto different lines for clarity in this discussion, XML does not employ line breaks to distinguish XML constructs. The tree hierarchy 204 in FIG. 2A corresponds to a data object model (DOM) for the ORG XML document in FIG. 2B.

Note that the mgr column need not correspond to any of the XML constructs—the manger-supervised employee relationship is indicated by the parent-child relationship of the nested XML elements. Note also that the XML representation of the data is rather verbose compared to the representation of the same data in the EMP table illustrated in Table 1.

Sequence Operator

A sequence operator is useful for generating a collection of child instances of XML type from an XML document or fragment. It is assumed for purposes of illustration that an ELIST document is stored in a file ELIST.xml and contains a list of employees and is represented as an instance of XML type as shown in Table 2a. It is further assumed that it is desired to manipulate the EMPLOYEE XML elements as separate instances of XML type.

TABLE 2a

ELIST element.

| line | ELIST element |
|---|---|
| 1 | <ELIST> |
| 2 |   <EMPLOYEE ENO = "1"> |
| 3 |     <ENAME> Linda </ENAME> <EINFO> . . . </EINFO> |
| 4 |   </EMPLOYEE> |

TABLE 2a-continued

ELIST element.

| line | ELIST element |
|---|---|
| 5 |   <EMPLOYEE ENO = "2"> |
| 6 |     <ENAME> Charles </ENAME> <EINFO> . . . </EINFO> |
| 7 |   </EMPLOYEE> |
| 8 |   <EMPLOYEE ENO = "4"> |
| 9 |     <ENAME> Alice </ENAME> <EINFO> . . . </EINFO> |
| 10 |   </EMPLOYEE> |
| 11 |   <EMPLOYEE ENO = "6"> |
| 12 |     <ENAME> Ray </ENAME> <EINFO> . . . </EINFO> |
| 13 |   </EMPLOYEE> |
| 14 |   <EMPLOYEE ENO = "7"> |
| 15 |     <ENAME> Vishnu </ENAME> <EINFO> . . . </EINFO> |
| 16 |   </EMPLOYEE> |
| 17 |   <EMPLOYEE ENO = "8"> |
| 18 |     <ENAME> Cetin </ENAME> <EINFO> . . . </EINFO> |
| 19 |   </EMPLOYEE> |
| 20 |   <EMPLOYEE ENO = "5"> |
| 21 |     <ENAME> Mary </ENAME> <EINFO> . . . </EINFO> |
| 22 |   </EMPLOYEE> |
| 23 |   <EMPLOYEE ENO = "3"> |
| 24 |     <ENAME> Terry </ENAME> <EINFO> . . . </EINFO> |
| 25 |   </EMPLOYEE> |
| 26 |   <EMPLOYEE ENO = "9"> |
| 27 |     <ENAME> Steve </ENAME> <EINFO> . . . </EINFO> |
| 28 |   </EMPLOYEE> |
| 29 | </ELIST> |

A standard SQL/XML function, EXTRACT can generate an instance of XML type listing the EMPLOYEE XML elements. For example, the command EXTRACT ('ELIST.xml', 'ELIST/EMPLOYEE')

extracts the XML elements EMPLOYEE from the ELIST.xml document and produces the resulting instance of XML type representing the XML constructs shown in Table 2b. In this instance all employees are first generation children XML elements. For example, employee Linda is represented by the element in lines 1–3 and the employee Charles is represented by the element in lines 4–6. Because there is no single root element, but multiple XML elements at the root level, this instance represents a fragment rather than an XML document.

TABLE 2b

Example instance of XML type generated by example EXTRACT command.

| line | XML instance from EXTRACT function |
|---|---|
| 1 | <EMPLOYEE ENO = "1"> |
| 2 |   <ENAME> Linda </ENAME> <EINFO> . . . </EINFO> |
| 3 | </EMPLOYEE> |
| 4 | <EMPLOYEE ENO = "2"> |
| 5 | <ENAME> Charles </ENAME> <EINFO> . . . </EINFO> |
| 6 | </EMPLOYEE> |
| 7 | <EMPLOYEE ENO = "4"> |
| 8 |   <ENAME> Alice </ENAME> <EINFO> . . . </EINFO> |
| 9 | </EMPLOYEE> |
| 10 | <EMPLOYEE ENO = "6"> |
| 11 |   <ENAME> Ray </ENAME> <EINFO> . . . </EINFO> |
| 12 | </EMPLOYEE> |
| 13 | <EMPLOYEE ENO = "7"> |
| 14 |   <ENAME> Vishnu </ENAME> <EINFO> . . . </EINFO> |
| 15 | </EMPLOYEE> |
| 16 | <EMPLOYEE ENO = "8"> |
| 17 |   <ENAME> Cetin </ENAME> <EINFO> . . . </EINFO> |
| 18 | </EMPLOYEE> |
| 19 | <EMPLOYEE ENO = "5"> |
| 20 |   <ENAME> Mary </ENAME> <EINFO> . . . </EINFO> |
| 21 | </EMPLOYEE> |

TABLE 2b-continued

Example instance of XML type generated by example EXTRACT command.

| line | XML instance from EXTRACT function |
|------|-----------------------------------|
| 22 | <EMPLOYEE ENO = "3"> |
| 23 | <ENAME> Terry </ENAME> <EINFO> . . . </EINFO> |
| 24 | </EMPLOYEE> |
| 25 | <EMPLOYEE ENO = "9"> |
| 26 | <ENAME> Steve </ENAME> <EINFO> . . . </EINFO> |
| 27 | </EMPLOYEE> |

To generate a separate instance of XML type for each employee, it is desirable to generate a sequence of instances of XML type from the output document depicted in Table 2b. The sequence of instances of XML type can be treated as a source of instances of XML type for storing in a table or for temporary use in a FROM clause. A sequence function is needed to generate a collection of instances of XML types. For example, a collection of instances of XML type produced from the output document of Table 2b is depicted in Table 3a. The instances appear in an order that corresponds to the order of those elements in the output XML document.

TABLE 3a

Example sequence of XML types from XMLSequence.

| Instance # | XML instance |
|------------|--------------|
| 1 | <EMPLOYEE ENO = "1"><br><ENAME> Linda </ENAME> <EINFO> . . . </EINFO><br></EMPLOYEE> |
| 2 | <EMPLOYEE ENO = "2"><br><ENAME> Charles </ENAME> <EINFO> . . . </EINFO><br></EMPLOYEE> |
| 3 | <EMPLOYEE ENO = "4"><br><ENAME> Alice </ENAME> <EINFO> . . . </EINFO><br></EMPLOYEE> |
| 4 | <EMPLOYEE ENO = "6"><br><ENAME> Ray </ENAME> <EINFO> . . . </EINFO><br></EMPLOYEE> |
| 5 | <EMPLOYEE ENO = "7"><br><ENAME> Vishnu </ENAME> <EINFO> . . . </EINFO><br></EMPLOYEE> |
| 6 | <EMPLOYEE ENO = "8"><br><ENAME> Cetin </ENAME> <EINFO> . . . </EINFO><br></EMPLOYEE> |
| 7 | <EMPLOYEE ENO = "5"><br><ENAME> Mary </ENAME> <EINFO> . . . </EINFO><br></EMPLOYEE> |
| 8 | <EMPLOYEE ENO = "3"><br><ENAME> Terry </ENAME> <EINFO> . . . </EINFO><br></EMPLOYEE> |
| 9 | <EMPLOYEE ENO = "9"><br><ENAME> Steve </ENAME> <EINFO> . . . </EINFO><br></EMPLOYEE> |

According to an embodiment of this aspect of the invention, an XMLSequence operator is provided that operates on an XML type instance representing an XML construct, such as depicted in Table 2b, and generates a document ordered collection of XML type instances, such as depicted in Table 3a.

FIG. 3 is a flow diagram that illustrates an overview of method 300 for generating a collection of XML type instances, according to an embodiment. Although steps are shown in FIG. 3 and subsequent flow diagrams in a particular order, in other embodiments the steps may be performed in a different order or overlapping in time.

In step 302, an SQL statement is received with an XMLSequence operator that operates on an XML type operand representing an XML construct. For example, an SQL statement S1a is received as indicated by the following:

```
SELECT * FROM                                    S1a.
    TABLE (
        XMLSequence(EXTRACT('ELIST.xml',
            'ELIST/EMPLOYEE'))
    )
```

In step 310, the XMLSequence operator is evaluated by generating an ordered collection including instances of XML type that correspond to the child nodes of the operand. For example, XMLSequence operates on operand EXTRACT('ELIST.xml','ELIST/EMPLOYEE'), which produces the XML constructs of Table 2b. XMLSequence is evaluated by generating the ordered collection with instances of XML type depicted in Table 3a that correspond to the child nodes of the operand depicted in Table 2b. The operand in statement S1 is an instance of XML type output from the EXTRACT function. In other embodiments, the operand may be an XML file or other data structure holding XML data.

As can be seen, this method provides the XMLSequence operator for use in a declarative statement that enhances the manipulation of XML data in a SQL compliant DBMS.

It is not necessary that all the child nodes of the operand be of the same type of XML element, as in the example illustrated above. For example, XMLSequence operating on an XML element EMPLOYEE, would produce two instances of XML type, one representing XML element ENAME, and a second representing XML element EINFO.

Using XMLSequence, only sub-elements that satisfy certain criteria are easily output as separate instances. For example, the XPath expression in statement S1a could be modified to statement S1b to include a predicate "[ENO<4]" that indicates ENO be less than 4.

```
SELECT * FROM                                    S1b.
    TABLE (
        XMLSequence(
            EXTRACT('ELIST.xml',
                'ELIST/EMPLOYEE[ENO<4]')
        ))
```

This modification produces a collection of instances of XML type listed in Table 3b.

TABLE 3b

Example sequence of instances of XML types from XMLSequence.

| Instance # | XML instance |
|------------|--------------|
| 1 | <EMPLOYEE ENO = "1"><br><ENAME> Linda </ENAME> <EINFO> . . . </EINFO><br></EMPLOYEE> |
| 2 | <EMPLOYEE ENO = "2"><br><ENAME> Charles </ENAME> <EINFO> . . . </EINFO><br></EMPLOYEE> |
| 3 | <EMPLOYEE ENO = "3"><br><ENAME> Terry </ENAME> <EINFO> . . . </EINFO><br></EMPLOYEE> |

In another example application, the EXTRACTVALUE function can be used to extract the names of the employees with the given range of employee numbers, according to statement S1c.

```
SELECT EXTRACTVALUE (value(t), '/EMPLOYEE[ENO<4]/    S1c.
  ENAME')
  FROM TABLE (
    XMLSequence(EXTRACT('ELIST.xml',
    'ELIST/EMPLOYEE'))
  )t
```

This modification produces a collection of text values listed in Table 3c.

TABLE 3c

Example text values from EXTRACTVALUE on XMLSequence output

| Text # | Text value |
|---|---|
| 1 | Linda |
| 2 | Charles |
| 3 | Terry |

Hierarchical Sequence Operator

In some circumstances, a sequence may be desired that does not discard hierarchical information in the XML construct. XMLSequence is not suitable for this purpose in all cases. It is assumed for purposes of illustration that the ORG document is stored in a file ORG.xml and that it is desired to generate a list of employees in the ORG document and to manipulate the employees as separate instances of XML type. For example, if XMLSequence operates directly on the XML document stored in ORG.xml, only one row corresponding to the root node Linda would be generated with all its descendents.

FIG. 4A is a flow diagram that illustrates an overview of a method 400 for generating a collection of XML type SQL constructs with additional hierarchical information, according to an embodiment.

In step 402, an SQL statement is received with an HierXMLSequence operator that operates on an XML operand. For example, an SQL statement S2 is received as indicated by the following:

```
SELECT * FROM                                        S2.
  TABLE (HierXMLSequence('ORG.xml'))
```

In step 410, the HierXMLSequence operator is evaluated by generating an ordered collection including instances of XML type that correspond to all descendent nodes of the operand and including a level for each descendent node in the tree hierarchy. For example, HierXMLSequence operates on operand 'ORG.xml' depicted in FIG. 2B. HierXMLSequence is evaluated by generating the ordered collection depicted in Table 4 with levels in the hierarchy and with instances of XML type that correspond to the descendent nodes of the operand depicted in FIG. 2B. In some embodiments, another operand is included to indicate an element type, such as EMPLOYEE, that corresponds to the instances of XML type to be included in the collection.

TABLE 4

Example sequence of SQL object types from HierXMLSequence.

| Object # | Level number | XML instance |
|---|---|---|
| 1 | 1 | \<EMPLOYEE ENO = "1"\><br>  \<ENAME\> Linda \</ENAME\> \<EINFO\> . . . \</EINFO\><br>\</EMPLOYEE\> |
| 2 | 2 | \<EMPLOYEE ENO = "2"\><br>  \<ENAME\> Charles \</ENAME\> \<EINFO\> . . .<br>  \</EINFO\><br>\</EMPLOYEE\> |
| 3 | 3 | \<EMPLOYEE ENO = "4"\><br>  \<ENAME\> Alice \</ENAME\> \<EINFO\> . . . \</EINFO\><br>\</EMPLOYEE\> |
| 4 | 4 | \<EMPLOYEE ENO = "6"\><br>  \<ENAME\> Ray \</ENAME\> \<EINFO\> . . . \</EINFO\><br>\</EMPLOYEE\> |
| 5 | 5 | \<EMPLOYEE ENO = "7"\><br>  \<ENAME\> Vishnu \</ENAME\> \<EINFO\> . . . \</EINFO\><br>\</EMPLOYEE\> |
| 6 | 5 | \<EMPLOYEE ENO = "8"\><br>  \<ENAME\> Cetin \</ENAME\> \<EINFO\> . . . \</EINFO\><br>\</EMPLOYEE\> |
| 7 | 3 | \<EMPLOYEE ENO = "5"\><br>  \<ENAME\> Mary \</ENAME\> \<EINFO\> . . . \</EINFO\><br>\</EMPLOYEE\> |
| 8 | 2 | \<EMPLOYEE ENO = "3"\><br>  \<ENAME\> Terry \</ENAME\> \<EINFO\> . . . \</EINFO\><br>\</EMPLOYEE\> |
| 9 | 3 | \<EMPLOYEE ENO = "9"\><br>  \<ENAME\> Steve \</ENAME\> \<EINFO\> . . . \</EINFO\><br>\</EMPLOYEE\> |

As can be seen, this method provides the HierXMLSequence operator for a declarative statement, which preserves hierarchical relationships in an XML construct when that construct is converted to a collection of XML type instances.

FIG. 4B is a flow diagram that illustrates an embodiment of step 410 of the method of FIG. 4A. In step 412, some variables are initialized. A variable indicating the current level is initialized with a value 0. In the illustrated embodiments, the data indicating level has a value of 1 at the root level and increases by one with each generation down the tree. In other embodiments, level can be indicated with other data, such as increments greater than one, prime numbers, letters of an alphabet, or a stored sequence of predetermined numbers. A variable indicating a previous node is set to null to indicate that no node of the tree has already been processed.

In step 414, the next XML construct for the next node in the tree is received in document order. For example, the XML construct for starting the element representing Linda is received, including tag "<EMPLOYEE . . . >" with attribute "ENO=1" from line 3 of FIG. 2B. In the illustrated embodiment, the sub-elements ENAME and EINFO from line 4 of FIG. 2B are also received.

In step 420 it is determined whether the next XML construct is a child node of the previous node or the previous node is null. For example, if the opening tag for the next EMPLOYEE element is encountered before the closing tag for the element corresponding to the previous node, then the next element is a child node. If so, then control passes to step 422. If not, then control passes to step 430.

In step 422, the current level is incremented and a row of the ordered collection is generated. For example, the current level is changed from 0 to 1 and the first row of Table 4, representing the first element of the collection of instances, is generated complete with the contents of sub-elements ENAME and EINFO. Control then passes to step 450.

In step 450, the variable indicating the previous node is reset to indicate the current next node. Control then passes to step 414 to receive a new next node, if any. For example, after processing the opening tags and elements of node 210 during step 422, the node 210 is made the previous node during step 450.

In the illustrated embodiment, the next four XML elements in the ORG.xml document are all children of the previous nodes, so steps 420, 422, 450 are repeated for each element. The level is incremented each time to values of 2, then 3, then 4 and then 5.

In step 430, it is determined whether the next node is a sibling of the previous node. For example, if the opening tag for the next EMPLOYEE element is encountered after the closing tag for the element corresponding to the previous node and before any other closing tags, then the next element is a sibling node. If the next element is a sibling node, then control passes to step 432. If not, then control passes to step 440.

In step 432, the current level is not changed and another element of the ordered collection is generated. For example, when the sibling node 280 representing Cetin is encountered after the node 270 representing Vishnu, the current level is 5. The level value is not changed and the sixth row of Table 4 is generated for the node representing Cetin, complete with the contents of sub-elements ENAME and EINFO. Control then passes to step 450, described above, to reset the variable indicating the previous node and return to step 414 to receive any additional XML constructs.

In the illustrated embodiment, the next XML element in the ORG.xml document, starting at line 19 and representing node 250 for Mary, is neither a child nor a sibling of the previous node 280 for Cetin, so control passes to step 440.

In step 440, it is determined whether the next node is an ancestor or a sibling of an ancestor of the previous node. For example, if the opening tag for the next EMPLOYEE element is encountered after the closing tag for the element corresponding to the previous node and after any additional closing tags, then the next element is an ancestor or sibling of an ancestor. If the next element is ancestor or sibling of an ancestor, then control passes to step 432. If not, then an error is indicated and control passes to step 490 to deal with the error.

In step 442, the current level is decremented by an amount related to the number of additional closing tags that were encountered before the opening tag for the XML construct of the next node. Another element of the ordered collection is generated with the appropriately decremented level and instance of XML type. For example, when the ancestor sibling node 250 representing Mary is encountered after the node 280 representing Cetin, two additional employee end tags are encountered (at lines 17 and 18 in FIG. 2B) so the current level is decremented by 2 from an old value of 5 to a new value of 3. The seventh row of Table 4 is generated for the node representing Mary, complete with the contents of sub-elements ENAME and EINFO. Control then passes to step 450, described above, to reset the variable indicating the previous node and to return to step 414 to receive any additional XML constructs.

Continuing in this manner, the instances of XML type of Table 4 and associated levels are generated from the XML operand ORG.xml.

Hierarchical Aggregate Operator

In some circumstances, a collection of XML type instances are combined into a single instance representing an ancestor XML construct. A standard XMLAgg function is used to generate an XML instance that combines the XML output from multiple XML types. All the XML instances generated from the collection appear as siblings in the aggregate XML instance. For example, the XML types in the collection of Table 3a can be aggregated using XMLAgg to generate the XML instance depicted in Table 2b.

In some circumstances an aggregate XML instance may be desired that incorporates hierarchical information associated with the instances of XML type to be aggregated. For example, the level information in Table 4 should be used to generate the nested XML elements in the XML ORG document depicted in FIG. 2B.

Figure 5A:
FIG. 5A is a flow diagram that illustrates an overview of a method for aggregating a collection of XML type SQL constructs with hierarchical information, according to an embodiment.

FIG. 5A is a flow diagram that illustrates an overview of a method 500 for aggregating a collection of XML type instances with hierarchical information, according to an embodiment.

In step 502, an SQL statement is received with a HierXMLAggregate operator that operates on an XML type operand from a collection, and on a level. For purposes of illustration, it is assumed that the rows of Table 4 are available from an XML type view called VEMP. A query to generate VEMP from table EMP is described in more detail in a later section. For example, an SQL statement S3 is received as indicated by the following:

SELECT HierXMLAggregate(LEVEL, EMPLOYEE) FROM VEMP S3.

In step 510, the HierXMLAggregate operator is evaluated by inserting the next XML type operand into an instance of XML type representing an ancestor XML construct at a level of the hierarchy for the XML construct, which depends on a level operand. For example, HierXMLAggregate operates on XML type operand EMPLOYEE object from VEMP and operand LEVEL from VEMP by inserting the next EMPLOYEE into a temporary output XML document at a level of the hierarchy based on the value of LEVEL. The output XML document or fragment corresponds to lines 3 through 29 of FIG. 2B.

As can be seen, this method provides the HierXMLAggregate operator for a declarative statement, which preserves hierarchical information associated with instances of XML type when those instances are combined into a single instance representing an XML construct.

Figure 5B:
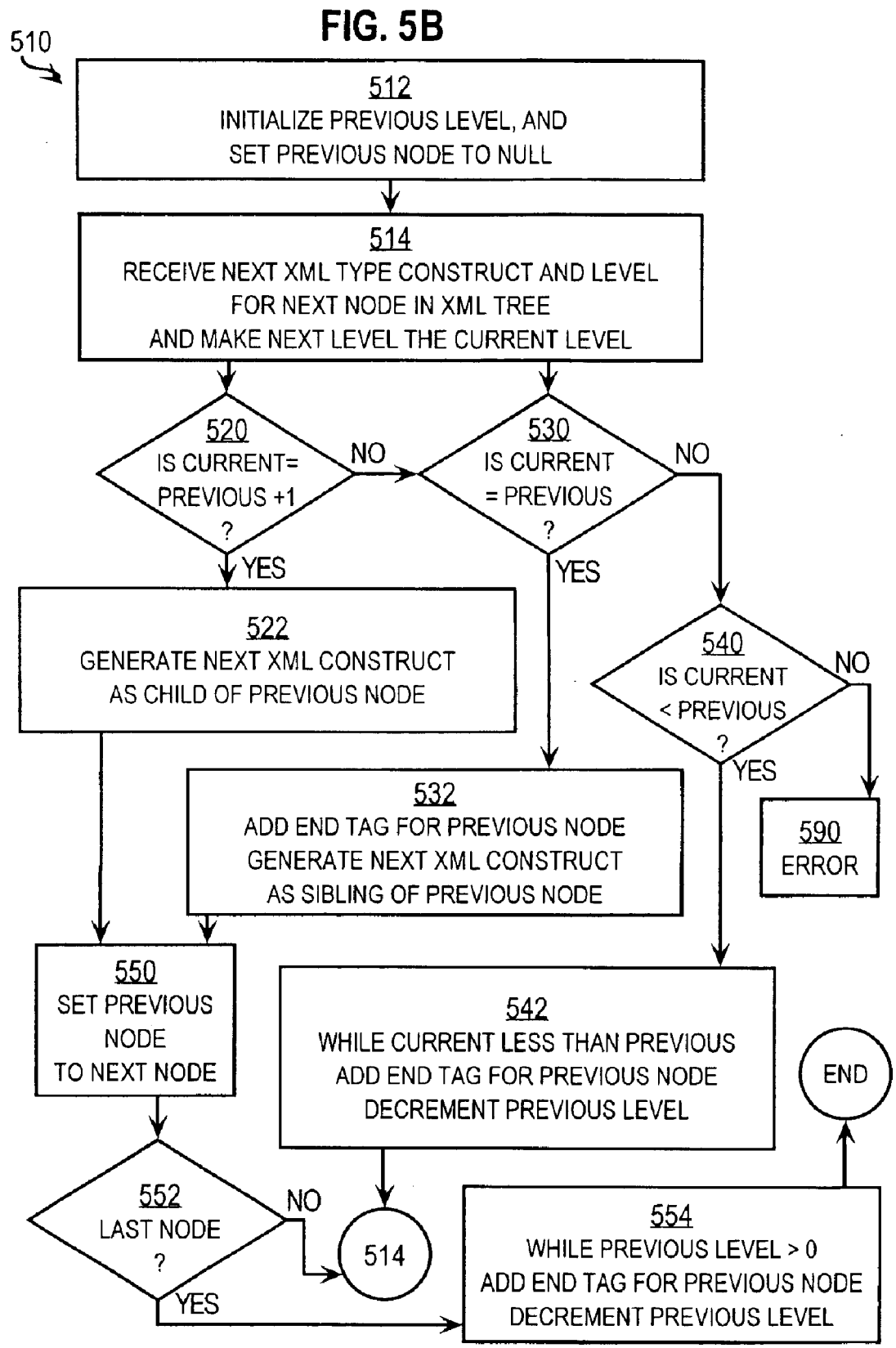
FIG. 5B is a flow diagram that illustrates an embodiment of a step of the method of FIG. 5A.

FIG. 5B is a flow diagram that illustrates an embodiment of step 510 of the method of FIG. 5A. In step 512, some variables are initialized. A variable indicating the previous level is initialized with a value 0. A variable indicating a previous node is set to null to indicate that no node of the tree has already been processed.

In step 514, the next instance of XML type and associated level in the tree are received in document order. For example, the EMPLOYEE instance of XML type representing Linda, including values for ENO, ENAME and EINFO, and the associated level 1, are received from row 1 of Table 4. The value of the associated level is stored in the variable representing the current level.

In step 520 it is determined whether the current level is equal to the previous level incremented by one level. A next instance of XML type with a level that satisfies this condition represents a child node of the previous node. If so, then control passes to step 522. If not, then control passes to step 530. For example, the current level 1 is equal to the previous level 0 plus 1, so control passes to step 522.

In step 522, the next instance of XML type is inserted as a child of the previous construct. For example, an opening tag is inserted for the next XML construct before a closing tag is inserted for a previous XML construct of the previous node. In the illustrated embodiment, an opening tag for XML construct EMPLOYEE corresponding to XML type EMPLOYEE (including the value for attribute ENO) is added to the output of XML type representing the XML document or fragment. In the illustrated embodiment, the opening and closing tags and values for ENAME and EINFO elements are also inserted into the output. Thus lines corresponding to lines 3 and 4 of FIG. 2B are inserted into the output. Control then passes to step 550.

In step 550, the variable indicating the previous node is reset to indicate the current next node. Control then passes to step 552.

In step 552, it is determined whether the last instance of XML type to be aggregated has been received. If not, control passes back to step 514 to receive a new next instance of XML type. If the last instance of XML type to aggregate has been received, control passes to step 554, described in more detail later in this section, to terminate the generation of the output.

In the illustrated embodiment, the next four instances of XML type in Table 4 all increase their level by one, to values of 2, then 3, then 4 and then 5, indicating all represent child nodes of previous nodes, so steps 520, 522, 550, 552 are repeated for each one. Consequently, lines corresponding to lines 5–12 in FIG. 2B are inserted into the output.

In step 530 it is determined whether the current level is equal to the previous level. A next instance of XML type with a level that satisfies this condition represents a sibling node of the previous node. If so, then control passes to step 532. If not, then control passes to step 540. For example, while operating on the sixth row of Table 4 for employee Cetin, the current level 5 is equal to the previous level 5, so control passes to step 532.

In step 532, the next instance of XML type is inserted as a sibling of the previous construct. For example, a closing tag is inserted for the previous XML construct of the previous node before an opening tag is inserted for the next XML construct. In the illustrated embodiment, a closing tag for XML construct EMPLOYEE is inserted before an opening tag for XML construct EMPLOYEE for employee Cetin is added to the output. In the illustrated embodiment, the opening tag for EMPLOYEE includes the value for attribute ENO; and the opening and closing tags and values for ENAME and EINFO elements are also inserted into the output XML document. Thus lines corresponding to lines 13–15 of FIG. 2B are inserted into the output. Control then passes to step 550.

In step 540, it is determined whether the current level is less than the previous level. A next instance of XML type with a level that satisfies this condition represents an ancestor or a sibling of an ancestor node of the previous node. If the current level is less, then control passes to step 542. If not, then control passes to step 590. For example, while operating on the seventh row of Table 4 for employee Mary, the current level 3 is less than the previous level 5, so control passes to step 542.

In step 542, closing tags for one or more previous XML constructs are inserted. In the illustrated embodiment, a closing tag for XML construct EMPLOYEE is inserted and the previous level is decremented as long as the current level is less than the previous level. For example, while operating on the seventh row of Table 4 for employee Mary, when the current level is 3, two closing tags are inserted and the previous level is decremented twice from 5 to 4 to 3. Thus lines corresponding to lines 16–17 of FIG. 2B are inserted into the output and the previous level is set to 3. In the illustrated embodiment, when the current level is not less than the previous level, then control passes to step 514. In other embodiments, when the current level is not less than the previous level, control may pass to step 520 or 530 or 532. Thus lines corresponding to lines 18–20 are inserted into the output.

Control passes to step 590 when an attempt is made to generate a descendent two or more generations below the current level. Such a change in level is not valid in an XML document. In step 590, the error is handled. For example, the XML construct generation is terminated and a warning message is sent to a user of the database.

Continuing in this manner, the XML constructs of lines 3 through 26 are generated from the XML type operands from Table 4. After line 26 is inserted, it is determined in step 552 that there are no more instances of XML type in Table 4. Control passes to step 554.

In step 554, closing tags for one or more previous XML constructs are inserted. In the illustrated embodiment, a closing tag for XML construct EMPLOYEE is inserted and the previous level is decremented as long as the current level is less zero (0). For example, after operating on the ninth row of Table 4 for employee Steve, the current level is 3. Therefore three closing tags are inserted and the previous level is decremented thrice, from 3 to 0. Thus lines corresponding to lines 27–29 of FIG. 2B are inserted into the output XML document.

Generating Level for Aggregate Operand

A level operand is needed to use the HierXMLAggregate operator. A value for the level operand can be generated from an SQL table like Table 1 with an implied hierarchy using an SQL "CONNECT BY" clause. For example, the SQL view VEMP with levels shown in Table 4 can be generated from the EMP table shown in Table 1 with the following SQL statement S4:

```
CREATEVIEW VEMP AS                                          S4.
    SELECT level,
        XMLElement("EMPLOYEE", XMLAttribute(eno),
        e.ename, e.einfo)
    AS EMPLOYEE
    FROM EMP e
    CONNECT BY prior e.eno = e.mgr
    START WITH e.mgr = null
```

In the above statement, the CONNECT BY clause causes a pseudo column "level" to be generated to indicate a level in a hierarchy generated.

The hierarchy starts with the row of EMP where the value in the MGR column is null. The next row is the next row in the table where the value in the MGR column is equal to the value in the ENO column of the previous row. The process generates a set of rows in a preordered depth first order, which is equivalent to XML document order. For example, the row for a parent is generated before the row of any of its children is generated, and rows for all leaf nodes of one sibling are generated before a row for the next sibling and any of its descendent is generated. Rows for siblings are generated in the order in which siblings appear in the underlying row set.

Thus statement S4 generates the VEMP view depicted in Table 4. VEMP can be used to obtain values for the level operand in the HierXMLAggregate operator. Furthermore, portions of statement S4 after the "CREATEVIEW VEMP AS" line can be used in a sub-query to generate values for the level operand in the HierXMLAggregate operator.

Hardware Overview

Figure 6:
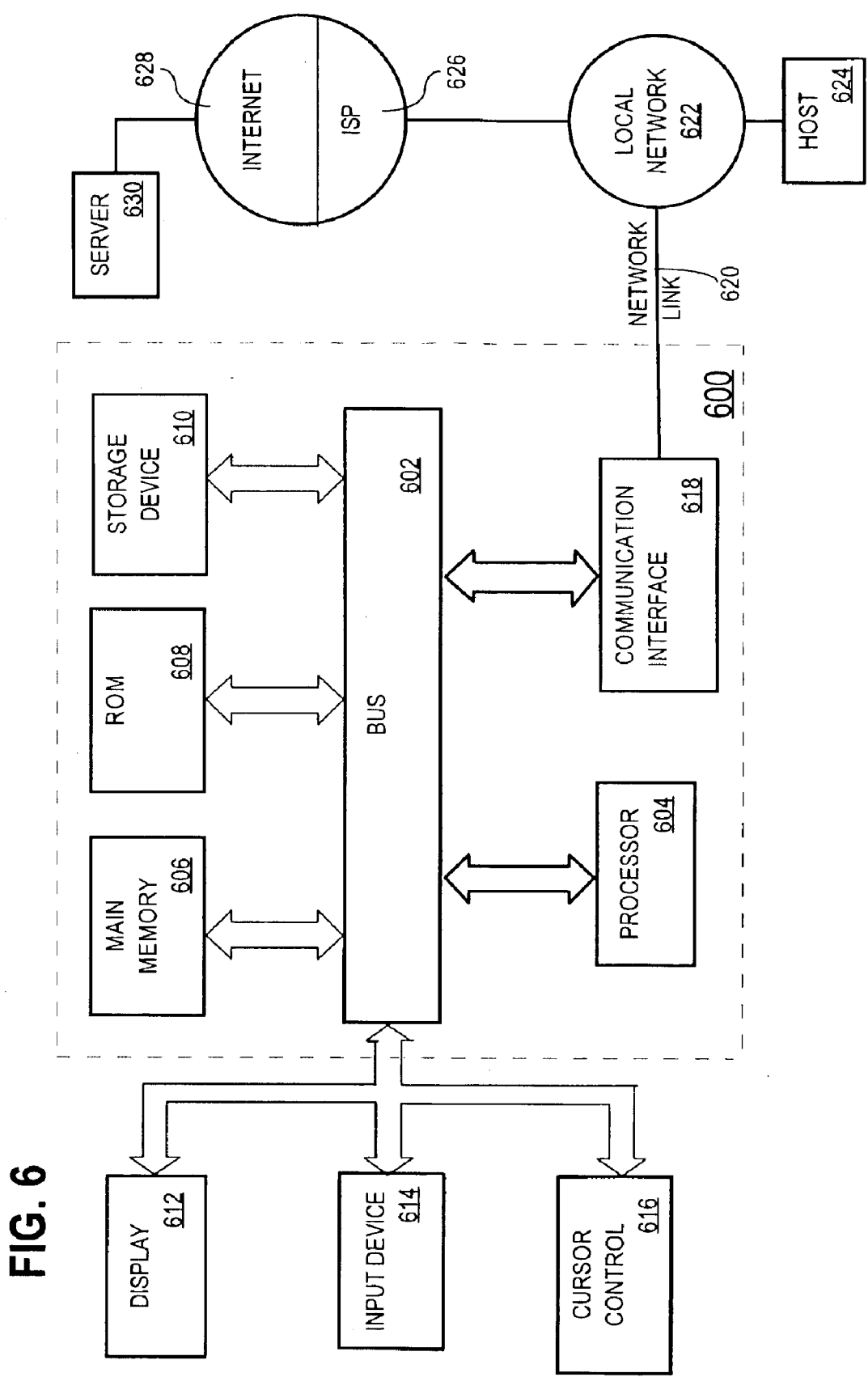
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for converting data between eXtensible Markup Language (XML) constructs and Structured Query Language (SQL) constructs in an SQL compliant database management system (DBMS) that allows data items to represent XML constructs, comprising the steps of:

receiving a SQL statement that includes a particular operator that operates on a first data item that represents a first set of zero or more XML elements; and during execution of the SQL statement, evaluating the particular operator by generating an ordered collection of zero or more data items, wherein each different data item in the ordered collection is based on a different XML element from the first set; and there is a data item in the ordered collection for every XML element in the first set.

2. A computer-implemented method for converting hierarchical data between eXtensible Markup Language (XML) constructs and Structured Query Language (SQL) constructs in an SQL compliant database management system (DBMS) that allows data items to represent XML constructs, comprising the steps of:

receiving a SQL statement that includes a particular operator that operates on a first data item that represents at least a first XML construct that includes a first set of one or more XML constructs for which the first XML construct is an ancestor node in an XML tree hierarchy; and during execution of the SQL statement, evaluating the particular operator by generating an ordered collection of one or more entries, wherein each entry in the ordered collection includes a particular data item that represents a particular XML construct of the first set, and data that indicates a level of the particular XML construct in the XML tree hierarchy.

3. The method of claim 2, wherein the data that indicates the level indicates a level of the particular XML construct below the first XML construct.

4. A computer-readable medium carrying one or more sequences of instructions which, when executed by one or more processors, causes the one or more processors to perform the method recited in claim 3.

5. The method of claim 2, said step of generating the ordered collection further comprising the steps of:

receiving from the first set a current XML construct at a next node of the XML tree hierarchy immediately subsequent to a first node of the XML tree hierarchy in XML document order;

generating a current data item to represent the current XML construct; and associating, in a particular entry in the ordered collection, a current level with the current data item.

6. The method of claim 5, said step of generating the ordered collection further comprising the steps of:

determining whether the next node is a child node of the first node in the XML tree hierarchy; and if it is determined that the current data item is the child node of the first node, then generating the current level by incrementing a first level associated with a second data item that represents the first node.

7. A computer-readable medium carrying one or more sequences of instructions which, when executed by one or more processors, causes the one or more processors to perform the method recited in claim 6.

8. The method of claim 5, said step of generating the ordered collection further comprising the steps of:

determining whether the next node is a sibling node of the first node in the XML tree hierarchy; and if it is determined that the next node is the sibling node of the first node, then generating the current level as equal to a first level associated with a second data item that represents the first node.

9. A computer-readable medium carrying one or more sequences of instructions which, when executed by one or more processors, causes the one or more processors to perform the method recited in claim 8.

10. The method of claim 5, said step of generating the ordered collection further comprising the steps of:

determining whether the next node is a sibling of an ancestor node of the first node in the XML tree hierarchy; and if it is determined that the next node is the sibling of the ancestor node, then generating the current level by decrementing a first level associated with a second data item that represents the first node by an amount related to a change in depth between the next node and the first node in the XML tree hierarchy.

11. A computer-readable medium carrying one or more sequences of instructions which, when executed by one or more processors, causes the one or more processors to perform the method recited in claim 10.

12. A computer-readable medium carrying one or more sequences of instructions which, when executed by one or more processors, causes the one or more processors to perform the method recited in claim 5.

13. A computer-readable medium carrying one or more sequences of instructions which, when executed by one or more processors, causes the one or more processors to perform the method recited in claim 1.

14. A computer-readable medium carrying one or more sequences of instructions which, when executed by one or more processors, causes the one or more processors to perform the method recited in claim 2.

15. A computer-implemented method for processing a Structured Query Language (SQL) statement, the method comprising:

detecting that the SQL statement includes a particular operator that specifies an operation for aggregating information from one or more relational tables; and during execution of the SQL statement that includes the particular operator, reading from the one or more relational tables attribute values, and corresponding level values; and generating hierarchical eXtensible Markup Language (XML) information as a result of said operation;

wherein, within said hierarchical XML information, each of the attribute values belongs to a hierarchical level that is based on the level value that corresponds to the attribute value.

16. The method of claim, 15 wherein:

the step of generating hierarchical XML information includes inserting a particular data item into the result;

the particular data item represents a next node of an XML tree hierarchy, which is subsequent to a first node of the XML tree hierarchy in XML document order;

the first node is represented by a first data item;

a closing tag for an XML construct for the first node has not been inserted into the result; and the first node resides at a first level in the XML tree hierarchy.

17. The method of claim 16, said step of inserting the particular data item into the result further comprising further comprising the steps of:

determining whether the particular level of the particular data item is one increment greater than the first level; and if it is determined that the particular level is one increment greater than the first level, then inserting an opening tag for the particular XML construct before inserting a closing tag.

18. A computer-readable medium carrying one or more sequences of instructions which, when executed by one or more processors, causes the one or more processors to perform the method recited in claim 17.

19. The method of claim 16, said step of inserting the particular data item into the result further comprising further comprising the steps of:

determining whether the particular level of the particular data item is equal to the first level; and if it is determined that the particular level is equal to the first level, then inserting a closing tag, and immediately after inserting the closing tag, inserting an opening tag for the particular XML construct.

20. A computer-readable medium carrying one or more sequences of instructions which, when executed by one or more processors, causes the one or more processors to perform the method recited in claim 19.

21. The method of claim 16, said step of inserting the particular data item into the result further comprising further comprising the steps of:

determining whether the particular level of the particular data item is less than the first level; and if it is determined that the particular level is less than the first level, then inserting a closing tag, and decrementing the first level.

22. A computer-readable medium carrying one or more sequences of instructions which, when executed by one or more processors, causes the one or more processors to perform the method recited in claim 21.

23. A computer-readable medium carrying one or more sequences of instructions which, when executed by one or more processors, causes the one or more processors to perform the method recited in claim 16.

24. A computer-readable medium carrying one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

PATENT NO. : 7,103,611 B2
APPLICATION NO. : 10/428443
DATED : September 5, 2006
INVENTOR(S) : Ravi Murthy et al.

Page 1 of 1

It is certified that error appears in the above-identified patent and that said Letters Patent is hereby corrected as shown below:

Title Page
(56)    under References Cited
        U.S. Patent Documents

Please insert

--6,269,380  B1     7/2001     Terry et al.
  6,279,006  B1     8/2001     Shigemi et al. --

Signed and Sealed this

Twelfth Day of December, 2006

JON W. DUDAS
*Director of the United States Patent and Trademark Office*